(12) United States Patent
Bolshakov (10) Patent No.: US 10,317,577 B2
(45) Date of Patent: Jun. 11, 2019

(54) OPTICAL ARTICLE COMPRISING AN ANTIREFLECTIVE COATING WITH A LOW REFLECTION BOTH IN THE ULTRAVIOLET REGION AND IN THE VISIBLE REGION

(71) Applicant: ESSILOR INTERNATIONAL (COMPAGNIE GENERALE D'OPTIQUE), Charenton-le-Pont (FR)

(72) Inventor: Ilya Bolshakov, Dallas, TX (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 15/504,481

(22) PCT Filed: Aug. 17, 2015

(86) PCT No.: PCT/EP2015/068840
§ 371 (c)(1),
(2) Date: Feb. 16, 2017

(87) PCT Pub. No.: WO2016/026808
PCT Pub. Date: Feb. 25, 2016

(65) Prior Publication Data
US 2017/0235020 A1    Aug. 17, 2017

(30) Foreign Application Priority Data

Aug. 18, 2014 (EP) .................... 14306286

(51) Int. Cl.
*G02B 1/16* (2015.01)
*G02B 5/28* (2006.01)
(Continued)

(52) U.S. Cl.
CPC .............. *G02B 1/116* (2013.01); *G02B 1/115* (2013.01); *G02B 1/16* (2015.01); *G02C 7/022* (2013.01);
(Continued)

(58) Field of Classification Search
CPC . G02C 7/022; G02C 7/02; G02C 7/04; G02C 7/027; G02C 2202/16; G02C 7/06;
(Continued)

(56) References Cited

U.S. PATENT DOCUMENTS

2007/0258038 A1* 11/2007 Kobayashi ............. G02B 1/115
351/44
2008/0084535 A1    4/2008 De Ayguavives et al.
(Continued)

FOREIGN PATENT DOCUMENTS

| EP | 2881763 | 6/2015 |
|----|---------|--------|
| JP | 2014052542 | 3/2014 |
| WO | WO2012/076714 | 6/2012 |

*Primary Examiner* — Evan P Dzierzynski
*Assistant Examiner* — Sharrief I Broome
(74) *Attorney, Agent, or Firm* — Norton Rose Fulbright US LLP (57) ABSTRACT

An ophthalmic lens with a low reflection in both the ultraviolet region and the visible region is disclosed. The ophthalmic lens comprises a substrate with a front main face and a rear main face. The rear main face is coated with a multilayered antireflective coating. The antireflective coating comprises a stack of at least one layer having a refractive index higher than 1.6 and of at least one layer having a refractive index lower than 1.55. The mean reflection factor $R_{uv}$ on the rear face between 280 nm and 380 nm, weighted by the function $W(\lambda)$, is lower than or equal to 5%, preferably is lower than or equal to 4%, for an angle of incidence of 35°. The Chroma C* of reflected light is equal to or lower than 4, preferably lower or equal to 3, for an angle of incidence ($\theta$) of 15°.

19 Claims, 1 Drawing Sheet (51) Int. Cl.
 *G02C 7/02* (2006.01)
 *G02C 7/10* (2006.01)
 *G02B 1/115* (2015.01)
 *G02B 1/116* (2015.01)
(52) U.S. Cl.
 CPC .............. *G02C 7/107* (2013.01); *G02B 5/283* (2013.01); *G02C 2202/16* (2013.01)
(58) Field of Classification Search
 CPC .... G02C 2202/22; G02C 7/028; G02C 7/049; G02C 7/083; G02C 7/024; G02C 7/061; G02C 2202/20; G02C 11/10; G02C 7/041; G02C 7/08; G02C 7/101; G02C 7/104; A61F 2/16; A61F 2/1613; A61F 2/1618; A61F 2/1654; A61F 2/14; A61F 2002/1699; A61F 2/1648; A61F 2/145; A61F 2/1624; A61F 2/1627; A61F 2002/0894; A61F 2002/1696; A61F 2009/00872; A61F 2009/00882; A61F 2009/021; G02B 1/041; G02B 1/115; G02B 1/04; G02B 1/18; G02B 1/11; G02B 1/043; G02B 1/105; G02B 1/116; G02B 1/12; G02B 1/14; G02B 27/0006; G02B 27/0025; G02B 27/0075; G02B 27/4211; G02B 27/0037; G02B 27/4205; G02B 3/0081

See application file for complete search history.

(56) References Cited

U.S. PATENT DOCUMENTS

2012/0075577 A1    3/2012   Ishak et al.
2013/0038834 A1*   2/2013   Cado ...................... G02B 1/115
                                                                 351/159.62

* cited by examiner

OPTICAL ARTICLE COMPRISING AN ANTIREFLECTIVE COATING WITH A LOW REFLECTION BOTH IN THE ULTRAVIOLET REGION AND IN THE VISIBLE REGION

CROSS-REFERENCE TO RELATED APPLICATIONS

This application is a national phase application under 35 U.S.C. § 371 of International Application No. PCT/EP2015/068840 filed 17 Aug. 2015, which claims priority to European Patent Application No. 14306286.7 filed 18 Aug. 2014. The entire contents of each of the above-referenced disclosures is specifically incorporated by reference herein without disclaimer.

FIELD OF THE INVENTION

The present invention relates to an optical article comprising on its rear face, and optionally on its front face, an antireflective coating which strongly reduce reflection in the UVA- and UVB-radiation range, and in the visible region with an achromatic residual reflected light The optical article may be an ophthalmic lens, especially a spectacle lens.

DESCRIPTION OF THE PRIOR ART

An antireflection coating usually consists of a multilayer comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

This antireflective coating is usually used in the ophthalmic field. Accordingly, traditional antireflective coatings are designed and optimized to reduce reflection on the lens surface in the visible region, typically within the spectrum range of from 380 to 780 nm. In general, the mean light reflection factor in the visible region $R_v$ on the front and/or rear faces of an ophthalmic lens is between 1.5 to 2.5%.

Some of these antireflective coatings may also be designed and optimized to reduce reflection on the back surface of the lens within the UVA band of from 315 to 400 nm and/or the UVB band of from 280 to 315 nm. These UVA and UVB bands are indeed particularly harmful to the retina.

The mean reflection in the UVA and UVB regions may thus attain high levels (up to 60%) for traditional antireflective lenses. In usual antireflective articles which are marketed by most of the manufacturers over the course of these recent years, the UV mean reflection does range from 10 to 25%, for an angle of incidence of from 30 to 45°. It is not problematic on the front face of the lens, since the major part of the UV radiation which comes from the front of the wearer and might attain the wearer's eye (normal incidence, 0 to 15°) generally get absorbed by the ophthalmic lens substrate.

On the contrary, the UV radiation resulting from light sources located behind the wearer may reflect on the lens rear face and reach the wearer's eye if the lens is not provided with an antireflective coating which is efficient in the ultraviolet region, thus potentially affecting the wearer's health. Such phenomenon is made stronger by the trend for fashion sunglasses with high diameters which increase the risk of stray reflections getting into the eyes.

It is admitted that the light rays that may reflect onto the lens rear face and reach the wearer's eye have a narrow incidence angle range, ranging from 30 to 45° (oblique incidence).

There is currently no standard relating to the UV radiation reflection from the rear face.

Besides, optimizing the antireflective performances over the whole ultraviolet region reveals generally detrimental to the antireflective performances in the visible region. Conversely, optimizing only the antireflective performances in the visible region does not make sure that satisfactory antireflective properties can be obtained in the ultraviolet region.

There are number of patent dealing methods for making antireflective coating that would be efficient in the visible region and which is, at the same time, eventually capable of reducing the UV radiation reflection.

For instance, the application WO2012/076714 describes an ophthalmic lens with very low reflectance values in the visible region. This ophthalmic lens comprises a substrate with a front main face and with a rear main face, the rear main face being coated with a multilayered antireflective coating comprising a stack of at least one layer having a refractive index higher than 1.6 and at least one layer having a refractive index lower than 1.5. The ophthalmic lens is characterized in that:

- the mean reflection factor on said rear face in the visible region $R_m$ is lower than or equal to 1.15%,
- the mean light reflection factor on said rear face in the visible region $R_v$ is lower than or equal to 1%,
- the mean reflection factor $R_{UV}$ on said rear face between 280 nm and 380 nm, weighted by the function $W(\lambda)$ defined in the ISO 13666:1998 standard, is lower than 5%, for an angle of incidence of 30° and for an angle of incidence of 45°,
- the multilayered antireflective coating comprises a number of layers higher than or equal to 3 and lower than or equal to 7, preferably lower than or equal to 6, more preferably lower than or equal to 5,
- the multilayered antireflective coating does not comprise any electrically conductive layer with a thickness higher than or equal to 20 nm based on indium oxide, and
- the antireflective coating outer layer is a silica-based layer.

The antireflective coatings described in this application are very efficient in the visible region ($R_v$ is lower than or equal to 1%), while being at the same time capable of significantly reducing the UVA radiation reflection, especially ultraviolet A- and ultraviolet B-rays.

However, it would be advisable to improve their robustness and their aesthetic appearance, especially at oblique incidence.

The term "robustness" of an antireflective coating in the present invention is defined as it's ability to show similar performances despite the variations induced by its manufacturing process. These variations depends, for instance, on the type of substrate which is used, the setting of the manufacturing machine (temperature schedule, appropriate time, setting of the electron gun . . . ) and/or its usage mode, the replacement of said manufacturing machine by another one.

Indeed, when multilayered antireflective coating is manufactured at industrial scale, some thickness variations for each layer generally occur. These variations lead to different reflection performance, and especially different perceived residual reflected color of the multilayered antireflective coating. If the perceived residual reflected color of the antireflective coating of two lenses is different, these lenses will appear different and will not be able to be associated in pair.

In addition, depending on the curvatures of the lenses and the value of incidence (angle θ), the residual reflected color of the multilayered antireflective coating of each lens seems not to be homogeneous in color on all the surface of the lens ("chameleon effect"). A different residual reflected color between the right and the left portions of a lens, such as a color gradient of different hues "h" (not the same color turning for instance from blue to red) or a color gradient of different color intensity (for example, turning from saturated color to a less saturated color, or inversely) may be viewed by an observer according to the incidence angle θ. Hence, it would be desirable to improve the esthetic appearance of such a lens.

For instance, the document US2012/075577 describes that for having a lens having a natural cosmetic appearance (i.e.: it will not appear tinted to an observer viewing a user of the lens or ophthalmic system), it is desirable for transmitted and reflected light to have CIE coordinates (x, y) in a xyY system as close as (0.33,0.33). However, this document does not mention how to obtain this CIE coordinates knowing that very close coordinates of (0.4;0.4) will appear yellow to an observer.

Thus, most of antireflection coatings developed hitherto have been optimized to minimize light reflection at normal incidence, without taking into account aesthetic appearance of the multilayered antireflective coating and/or their robustness properties.

Therefore, there is still a need to provide novel antireflective coatings having very good antireflective properties at least in the visible region and possibly in the UVA and UVB bands, while having at the same time robustness properties and aesthetic appearance versus the antireflective coatings of the prior art.

SUMMARY OF THE INVENTION

An object of the invention is therefore to remedy the above drawbacks, by seeking to develop a transparent optical article, especially an ophthalmic lens, comprising a substrate in mineral or organic glass comprising at least an antireflective coating, said antireflective coating possessing very good antireflective performances in the visible region, while guarantying both good aesthetics and high robustness, and to do so without compromising the economic and/or industrial feasibility of its manufacture.

In addition, another aspect of the invention the antireflective coating is eventually able to reduce the UV radiation reflection, especially ultraviolet A- and ultraviolet B-rays, as compared to a bare substrate or to a substrate comprising a traditional antireflective coating.

The invention therefore relates to an optical article, preferably an ophthalmic lens, comprising a transparent substrate with a front main face and a rear main face, said rear main face being coated with a multilayered antireflective coating comprising a stack of at least one layer having a refractive index higher than 1.6 and of at least one layer having a refractive index lower than 1.55, wherein:

the mean reflection factor $R_{UV}$ on said rear face between 280 nm and 380 nm, weighted by the function W(λ) defined in the ISO 13666:1998 standard, is lower than or equal to 5%, preferably is lower than or equal to 4%, for an angle of incidence of 35°, the Chroma C* of reflected light, as defined in CIE 1976 colour space, is equal or lower than 4, preferably lower or equal to 3, for an angle of incidence (θ) of 15°.

Hence, due to the characteristics of the optical article of the invention, and in particular the achromatic residual reflected color of the ophthalmic lens surface (C*≤4), the esthetic appearance of such a lens surface has been improved. This is especially desirable for tinted lenses, because light reflected by a dark background is well contrasted and more visible for the lens wearer or an observer.

BRIEF DESCRIPTION OF THE DRAWING

The present invention will be described in more detail by referring to the appended drawing, wherein.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values <<from X to Y>> or "between X to Y", according to the present invention, means as including the values of X and Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

The optical article prepared according to the present invention is a transparent optical article, preferably a lens or lens blank, and more preferably an ophthalmic lens or lens blank. The optical article may be coated on its convex main side (front side), concave main side (back side), or both sides using the invention.

Generally speaking, the antireflective coating of the optical article according to the invention, which will be called the "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephtalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Particularly recommended substrates include those substrates obtained through (co)polymerization of the diethyleneglycol bis-allyl-carbonate, marketed, for example, under the trade name CR-39® by the PPG Industries company (ORMA® lenses, ESSILOR), or polyurethanes, marketed for instance under MR series by Mitsui, or allylic and (meth)acrylic copolymers, having a refractive index between 1.54 and 1.58.

Prior to depositing the antireflective coating onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

As previously mentioned, the transparent substrate such as described above, is coated, at least on its rear face, with a multilayered antireflective coating comprising a stack of at least one layer having a refractive index higher than 1.6 and of at least one layer having a refractive index lower than 1.55, wherein:

the mean reflection factor $R_{UV}$ on said rear face between 280 nm and 380 nm, weighted by the function $W(\lambda)$ defined in the ISO 13666:1998 standard, is lower than or equal to 5%, preferably is lower than or equal to 4%, for an angle of incidence of 35°, the Chroma C* of reflected light is equal or lower than 4, preferably lower or equal to 3.5, especially 3, for an angle of incidence ($\theta$) of 15°. For this angle of incidence, it is preferably lower than or equal to one of the following values: 4, 3.5, 3, 2.5, 2 or 1.5.

In particular, Chroma C* of reflected light for an angle of incidence ($\theta$) of 15° is located in the area of the La*b* space defined by: $-3 \leq a^* \leq 1$ and $-4 \leq b^* \leq 1$ and $(a^*+b^*) \geq -5$.

According to a an embodiment, Chroma C* of reflected light measured on two separated points of the same lens differs by less than 2.

Indeed, the international colorimetric system especially enables to determine the color variation: CIEΔE76. This parameter is defined by the following formula per "CIE 1976 L*a*b* Color space standard:

$$\Delta E^* = \sqrt{(L_1-L_2)+(a_1-a_2)^2+(b_1-b_2)^2}$$

wherein:
$L_1$, $a_1$, $b_1$ which are the coordinates in the CIE Lab color space of the first color to compare and $L_2$, $a_2$, $b_2$ are the ones of the second color to compare. This color difference is unperceivable by human eyesight when ΔE76<2. In other words, a difference of chroma of 2 (with a same hue) will be perceived by human eyesight and allows for comparison of aesthetic appearance of ophthalmic lenses.

According to the invention, the "angle of incidence (symbol $\theta$)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* are calculated between 280 and 780 nm, taking the standard illuminant D 65 and the observer into account (angle of 10°). It is possible to prepare antireflective coatings, without limitation as regards their hue angle. The observer is a "standard observer" as defined in the international colorimetric system CIE L*a*b*.

Without being bound by any theories, it seems that the antireflective coating according to the invention has a residual reflected colour which is very low saturated in colour, so that ophthalmic lenses with such antireflective coatings will appear colourless, in other words achromatic. Actually, applicant determined that when the Chroma C* of reflected light of an optical article is located inside a circle of radius 4, as shown on FIG. 2, this article appear colourless to most observers. When Chroma C* of reflected light is located in zone A of FIG. 2 (defined as $-3<=a*<=1$ and $-4<=b*<=1$ and $(a*+b*)>=-5$, where a* is on the X-axis and b* on the Y-axis), all observers considered optical articles colourless. In addition, it has been surprisingly found that the ophthalmic lens according to the invention presents good robustness properties. This means that small variations in antireflective coating thicknesses, due to process variations or due to ophthalmic lens curvature, lead to non visible differences for observers. In other words:

lenses produced in different batches or with different equipments will have matched colours for observers and may be associated in pairs, on a single ophthalmic lens, Chroma C* of reflected light measured on two separated points of the lens, for instance in the center and on the periphery of the lens, will not differ by more than 2.

Besides, the antireflective coating according to the invention is especially designed to possess very good antireflective performances in the visible regions and/or to minimize the reflection towards the eye of the ultraviolet radiation having an angle of incidence on the lenses especially ranging from 30 to 45°, and its preferred characteristics are described hereunder.

In the present application, the mean reflection factor between 280 nm and 380 nm, weighted by the W(λ) function defined according to the ISO 13666:1998 Standard and noted $R_{UV}$, may be defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein R(λ) represents the lens spectral reflection factor at a given wavelength, and W(λ) represents a weighting function equal to the product of the solar spectrum irradiance Es(λ) and the efficiency relative spectral function S(λ).

The spectral function W(λ), enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy Es(λ) into account, which does globally emit less UVB-rays as compared to UVA-rays, and the spectral efficiency S(λ), UVB-rays being more harmful than UVA-rays. The values for those three functions in the ultraviolet region are given in the following table 1:

TABLE 1

| Wavelength λ (nm) | Solar spectrum irradiance Es(λ) (mW/m² · nm) | Efficiency relative spectral function S(λ) | Weighting function W(λ) = Es(λ) · S(λ) |
|---|---|---|---|
| 280 | 0 | 0.88 | 0 |
| 285 | 0 | 0.77 | 0 |
| 290 | 0 | 0.64 | 0 |
| 295 | 2.09 × 10⁻⁴ | 0.54 | 0.00011 |
| 300 | 8.10 × 10⁻² | 0.30 | 0.0243 |
| 305 | 1.91 | 0.060 | 0.115 |
| 310 | 11.0 | 0.015 | 0.165 |
| 315 | 30.0 | 0.003 | 0.09 |
| 320 | 54.0 | 0.0010 | 0.054 |
| 325 | 79.2 | 0.00050 | 0.04 |

TABLE 1-continued

| Wavelength λ (nm) | Solar spectrum irradiance Es(λ) (mW/m² · nm) | Efficiency relative spectral function S(λ) | Weighting function W(λ) = Es(λ) · S(λ) |
|---|---|---|---|
| 330 | 101 | 0.00041 | 0.041 |
| 335 | 128 | 0.00034 | 0.044 |
| 340 | 151 | 0.00028 | 0.042 |
| 345 | 170 | 0.00024 | 0.041 |
| 350 | 188 | 0.00020 | 0.038 |
| 355 | 210 | 0.00016 | 0.034 |
| 360 | 233 | 0.00013 | 0.03 |
| 365 | 253 | 0.00011 | 0.028 |
| 370 | 279 | 0.000093 | 0.026 |
| 375 | 306 | 0.000077 | 0.024 |
| 380 | 336 | 0.000064 | 0.022 |

It should be noted that the weighting function W(λ) is nil or almost nil between 280 nm and 295 nm, which means that the weighted mean reflection factor is also nil within this wavelength range. This means that even if the reflection level is high over this spectral range, there will be no consequence on the weighted mean reflection factor value $R_{UV}$ calculated between 280 and 380 nm.

According to the invention, the mean reflection factor on said rear face in the visible region $R_m$ is lower than or equal to 3%, preferably lower than or equal to 2.5%, for an angle of incidence lower than or equal to 35°, typically at 15°.

In the present application, the "mean reflection factor," noted $R_m$, is such as defined in the ISO 13666:1998 Standard, and measured in accordance with the ISO 8980-4 Standard (for an angle of incidence lower than 17°, typically of 15°), i.e. this is the (non weighted) spectral reflection average over the whole visible spectrum between 400 and 700 nm.

In particular, the mean light reflection factor on said rear face in the visible region $R_v$ is lower than or equal to 2%, preferably lower than or equal to 1.5%, for an angle of incidence lower than or equal to 35°, typically at 15°.

The "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

The mean reflection factor between 280 and 380 nm, noted $R_{mUV}$ can be defined by analogy, which corresponds to the mean spectral reflection between 280 and 380 nm. According to the invention, this factor may be measured at an angle of incidence that may range from 30 to 45°. Similarly, the mean reflection factors in the UVA and UVB ranges, noted $R_{mUVA}$ and $R_{mUVB}$, are defined, the sum of which corresponds to the above mean reflection factor in the ultraviolet region (280-380 nm), noted $R_{mUV}$.

According to the present invention, the antireflective coating deposited onto the rear face of the substrate is such that:

the mean reflection factor $R_{UV}$ on said rear face between 280 nm and 380 nm, weighted by the function W(λ) defined according to the ISO 13666:1998 Standard, is lower than or equal to 5%, for an angle of incidence of 35°. For these angles of incidence, it is preferably lower than or equal to one of the following values: 4.5%, 4%, 3.5%, 3%, 2.5%, 2%, 1.5%.

the mean reflection factor on said rear face in the visible region $R_m$ of the optical article is lower than or equal to 3%, preferably ≤2.5%, more preferably ≤2% for an angle of incidence lower than or equal to 35°, the mean light reflection factor on said rear face in the visible region $R_v$ of the optical article is lower than or equal to 2%, preferably ≤1.5%, more preferably ≤1.0%, especially ≤0.85% for an angle of incidence lower than or equal to 35°, typically at 15°;* the mean reflection factor in the ultraviolet region $R_{mUV}$ is lower than or equal to 5%, for an angle of incidence of 35°. For these angles of incidence, it is preferably lower than or equal to one of the following values: 4.5%, 4%, 3.5%.

The person skilled in the art, with its general knowledge is fully capable of choosing the suitable materials and thicknesses for the various layers of the antireflective coating so as to have the different desired parameters $R_v$, $R_m$ and $R_{UV}$.

The multilayered antireflective coating of the invention comprises a stack of at least one layer with a high refractive index and of at least one layer with a low refractive index.

More preferably, it comprises at least the antireflective coating comprises at least two layers having a refractive index higher than 1.6 (HI) and at least two layers having a refractive index lower than 1.55 (LI). It is here a simple stack, since the layer total number in the antireflective coating is higher than or equal to 3, preferably higher than or equal to 4, and lower than or equal to 7, more preferably lower than or equal to 6, even more preferably lower than or equal to 5, and most preferably equal to 5 layers.

As used herein, a layer of the antireflective coating is defined as having a thickness higher than or equal to 1 nm. Thus, any layer having a thickness lower than 1 nm will not be considered when counting the number of layers in the antireflective coating. The sub-layer either is not considered when counting the number of layers of the antireflective coating.

Unless stated otherwise, all thicknesses disclosed in the present application relate to physical thicknesses.

HI layers and LI layers don't need to alternate with each other in the stack, although they also may, according to one embodiment of the invention. Two HI layers (or more) may be deposited onto each other, as well as two LI layers (or more) may be deposited onto each other.

In the present application, a layer of the antireflective coating is said to be a layer with a high refractive index (HI) when its refractive index is higher than or equal to 1.6, preferably higher than or equal to 1.7, even more preferably higher than or equal to 1.8 and most preferably higher than or equal to 1.9. Said HI layer preferably has a refractive index lower than 2.1. A layer of an antireflective coating is said to be a low refractive index layer (LI) when its refractive index is lower than 1.55, preferably lower than or equal to 1.48, more preferably lower than or equal to 1.47. Said LI layer preferably has a refractive index higher than 1.1.

Unless otherwise specified, the refractive indexes referred to in the present application are expressed at 25° C., at atmospheric pressure and at a wavelength of 550 nm.

The HI layer is a traditional high refractive index layer, that is well known in the art. It generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$). Optionally, the HI layers may further contain silica or other materials with a low refractive index, provided they have a refractive index higher than or equal to 1.55 as indicated hereabove. The preferred materials include $TiO_2$, $PrTiO_3$, $ZrO_2$, $Al_2O_3$, $Y_2O_3$ and mixtures thereof.

The LI layer is also well known and may comprise, without limitation, $SiO_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer. Preferably, the LI layers in the antireflective coating are not $MgF_2$ layers.

Optionally, the LI layers may further contain materials with a high refractive index, provided the refractive index of the resulting layer is lower than 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The antireflective coating outer layer is necessarily a silica-based layer, comprising preferably at least 80% by weight of silica, more preferably at least 90% by weight of silica (for example a silica layer doped with alumina), relative to the layer total weight, and even more preferably consists in a silica layer.

Generally, the HI layers have a physical thickness ranging from 10 to 160 nm, and the LI layers have a physical thickness ranging from 10 to 100 nm.

Generally, the antireflective coating total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm.

In one embodiment of the present invention, the antireflective coating is deposited onto a sub-layer. It should be noted that such antireflective coating sub-layer does not belong to the antireflective coating. In particular, the antireflective coating is deposited on a silica-based sub-layer layer having a thickness of from 100 to 300 nm.

As used herein, an antireflective coating sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

The optical article of the invention may be made antistatic, that is to say not to retain and/or develop a substantial static charge, by incorporating at least one charge dissipating conductive layer into the stack present on the surface of the article.

According to the invention, the antireflective coating comprises at least one electrically conductive layer enables to have a discharge time of 500 ms or less after a static charge has been applied onto the surface of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminium-doped zinc oxide (ZnO:Al), indium oxide ($In_2O_3$) and tin oxide ($SnO_2$) are preferred. In a most preferred embodiment, the electrically conductive and optically transparent layer is a indium-tin oxide layer, noted ITO layer or a tin oxide layer.

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

Preferably, the antireflective coating of the invention comprises a first layer or superposition of layers consisting in 1, 2 or 3 layers having a refractive index higher than or equal to 1.6 coated with a second layer or superposition of layers consisting in 1 or 2 layers having a refractive index lower than 1.55. Optionally, this second layer or superposition of layers is coated with a third layer or superposition of layers consisting in 1 or 2 layers having a refractive index higher than or equal to 1.6, itself coated with a fourth layer or superposition of layers consisting in 1 or 2 layers having a refractive index lower than 1.55.

According to a particular embodiment the antireflective coating comprises, in the direction moving away from the substrate, a layer having a refractive index higher than 1.6 with a thickness of from 8 to 25 nm, a layer having a refractive index lower than 1.55 with a thickness of from 15 to 40 nm, a layer having a refractive index higher than 1.6 with a thickness of from 80 to 115 nm, more preferably from 85 to 110 nm, optionally an electrically conductive layer with a thickness of from 3 to 10 nm, and a layer having a refractive index lower than 1.55, with a thickness of from 65 to 95 nm.

In a specific embodiment the antireflective coating comprises, in the direction moving away from the substrate, a layer having a refractive index higher than 1.6 with a thickness of from 10 to 18 nm, a layer having a refractive index lower than 1.55 with a thickness of from 25 to 35 nm, a layer having a refractive index higher than 1.6 with a thickness of from 95 to 110 nm, optionally an electrically conductive layer with a thickness of from 3 to 10 nm, and a layer having a refractive index lower than 1.55, with a thickness of from 75 to 85 nm.

In another specific embodiment the antireflective coating comprises, in the direction moving away from the substrate, a layer having a refractive index higher than 1.6 with a thickness of from 18 to 25 nm, a layer having a refractive index lower than 1.55 with a thickness of from 15 to 25 nm, a layer having a refractive index higher than 1.6 with a thickness of from 85 to 95 nm, optionally an electrically conductive layer with a thickness of from 3 to 10 nm, and a layer having a refractive index lower than 1.55, with a thickness of from 70 to 90 nm.

In another embodiment, the layer having a refractive index higher than or equal to 1.6 is made of at least zirconia and the layer having a refractive index lower than 1.55 is made of at least silica.

The present invention provides hence an antireflective coating with an improved conception, comprising a stack made of thin layers, the thicknesses and materials of which have been selected so as to obtain satisfactory antireflective performances both in the visible region and in the ultraviolet region, while having both esthetic appearance, especially a low chroma of residual reflected light, and robustness properties.

The anti-UV antireflective coatings of the front face and of the rear face may be the same or different.

For instance, it is possible for the rear face of the optical article to be coated with an antireflective coating that is more efficient in the UVA and UVB bands than that of the substrate's front face (according to the characteristics described above), especially at an angle of incidence from 30 to 45°.

The anti-UV, antireflective coating may be deposited directly onto a bare substrate. In some applications, it is preferred for the main face of the substrate to be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The anti-UV, antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

The optical article according to the invention may also comprise coatings formed on the antireflective coating and capable of modifying the surface properties thereof, such as hydrophobic and/or oleophobic coatings (antifouling top coat). These coatings are deposited onto the outer layer of the antireflective coating.

Typically, an ophthalmic lens according to the invention comprises a substrate that is successively coated on its rear face with an impact-resistant primer layer, an anti-abrasion and scratch-resistant layer, an anti-UV, antireflective coating according to the invention, and with a hydrophobic and/or oleophobic coating, or with a hydrophilic coating which provides antifog properties, or an antifog precursor coating. The ophthalmic lens according to the invention is preferably an ophthalmic lens for spectacles (spectacle lens), or a blank for ophthalmic lenses. The lens may be a polarized lens, a photochromic lens or a solar lens, which may be tinted or not, be corrective, or not.

The front face of the substrate of the ophthalmic lens may be successively coated with an impact-resistant primer layer, an abrasion-resistant layer and/or a scratch-resistant layer, an antireflective coating which may be, or not, an anti-UV, antireflective coating according to the invention, and with a hydrophobic and/or oleophobic coating.

In one embodiment, the optical article according to the invention does not absorb in the visible or not much, which means, in the context of the present application, that its transmission factor in the visible range $\tau_v$, also called relative transmission factor in the visible range, is higher than 90%, more preferably higher than 95%, even more preferably higher than 96% and most preferably higher than 97%.

The factor $\tau_v$ should be understood as defined by the international normalized definition (ISO 13666:1998 Standard) and is measured in accordance with the ISO 8980-3 Standard. It is defined in the wavelength range of from 380 to 780 nm.

Preferably, the light absorption of the article coated according to the invention is lower than or equal to 1%.

The following examples illustrate the present invention in a more detailed, but non-limiting manner.

EXAMPLES

In the examples, five lenses according to the invention (lenses 1 to 5) and two lenses according to the prior art have been prepared (comparative examples 1 and 2).

1. General Procedures

The ophthalmic lenses used in the examples according to the invention comprise a lens substrate having a 65 mm diameter, a refractive index of 1.5 or 1.67, and a power of −2.00 diopters, coated with a hard coat layer of refractive index 1.5 (such as those described in EP0614957) and coated on its front face with an sub-layer made of $SiO_2$ (lenses 1 to 4).

For example 5, lenses from various substrates have been prepared and characterized:

8 lenses made of CR-39© (material available from PPG, referred as n=1.5)

2 lenses made of MR8© (material available from Mitsui Chemicals, referred as n=1.6)

2 lenses made of MR7© (material available from Mitsui Chemicals, referred as n=1.67).

The ITO layer is composed of tin doped with 10% of indium oxide.

The layers of the antireflective coating were deposited without heating the substrates by evaporation under vacuum (evaporation source: electron gun).

The deposition frame is a Leybold 1104 (lenses 1 to 4) or a Satis 1200 (lenses 5) machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, a step of activating the surface of the substrate by means of an argon ion beam (anode current: 1 A, anode voltage: 100 V, neutralization current: 130 mA), turning the ion irradiation off, forming the sub-layer on the substrate by evaporation (for lenses 1 to 4), then subsequently the various layers of the antireflective coating by successive evaporations and at last a ventilation step.

3. Results

The structural characteristics and the optical performances of the ophthalmic lenses 1 to 5 obtained respectively in the Examples 1 to 5 are detailed hereunder.

The reflection mean factor values are those of the front face. The factors $R_v$, $R_m$, $R_{muv}$ and $R_{uv}$ are provided for an angle of incidence θ of 15°, 35° or 45° and the colorimetric coefficients of the optical article of the invention in the international colorimetric system CIE L*a*b* are calculated between 380 and 780 nm, taking the standard illuminant D 65 at various angle of incidence θ and the observer into account (angle of 10°) (for all the examples). Values for Chroma at 15° and $R_{uv}$ at 35° are averaged values.

Comparatives lenses have also been prepared. The examples 4 and 10 of the prior art publication WO2012/076714 have been reproduced (respectively named comp. ex. 1 and comp. ex. 2). The results are given in the following table 2.

TABLE 2

| Layer (physical thickness in nm) | Ex 1 | Ex. 2 | Ex. 3 | Ex. 4 | Ex. 5 | comp. ex. 1 | comp. ex. 2 |
|---|---|---|---|---|---|---|---|
| Sub-layer ($SiO_2$) | 165.88 | 150.0 | 150.0 | 150.0 | None | 150 | 150 |
| 1—$ZrO_2$ | 16.58 | 12.08 | 23.3 | 20.56 | 13.9 | 13 | 11 |
| 2—$SiO_2$ | 25.66 | 32.24 | 22.8 | 18.09 | 29.0 | 31 | 33 |
| 3—$ZrO_2$ | 99.83 | 107.35 | 93.8 | 85.87 | 101.7 | 93 | 90 |
| 4—ITO | 3.1 | 6.50 | 6.5 | 6.50 | 6.5 | 6.5 | 6.5 |
| 5—$SiO_2$ | 81.99 | 76.13 | 85.7 | 70.65 | 77.0 | 88 | 84 |

Performances

| | | | | | Substrate | C*/h | | |
|---|---|---|---|---|---|---|---|---|
| $C^*$ ($\theta$ = 15°)/Hue (h) | 1.3/ 219° | 1.4/ 193° | 1.6/ 59° | 0.5/ 181° | n = 1.5<br>n = 1.6<br>n = 1.67 | 1.3/316°<br>1.2/192°<br>1.0/290° | 8.5/ 250° | 15/ 45° |
| $R_{uv}$ ($\theta$ = 35°) (280-380) | 3.0 | 3.7 | 4.5 | 3.6 | n = 1.5<br>n = 1.6<br>n = 1.67 | 1.4%<br>1.7%<br>1.7% | 4.2 | 2.6 |

Performances of Lenses 1, 2 and 4 for an Angle of Incidence of 15°, 35° and 45°

TABLE 3

| Lens | Angle θ | h° | C* | $R_m$, % (400-700 nm) | $R_v$, % (380-780) | Rmuv, % (280-380 nm) | Ruv, % (280-380 nm) |
|---|---|---|---|---|---|---|---|
| Lens 1 | 15° | 219 | 1.3 | 0.58 | 0.19 | 6.96 | 4.04 |
| | 35° | 105 | 1.9 | 0.91 | 0.27 | 4.78 | 3.02 |
| | 45° | 42 | 2.2 | 1.64 | 0.97 | 4.05 | 3.20 |
| Lens 2 | 15° | 193 | 1.4 | 0.77 | 0.66 | 8.43 | 6.90 |
| | 35° | 360 | 0.4 | 1.23 | 0.99 | 5.70 | 3.72 |
| | 45° | 348 | 2.3 | 2.06 | 1.65 | 4.51 | 2.59 |
| Lens 4 | 15° | 181 | 0.5 | 1.27 | 0.98 | 3.30 | 4.07 |
| | 35° | 336 | 7.1 | 2.04 | 1.40 | 2.72 | 3.63 |
| | 45° | 344 | 9.8 | 3.10 | 2.18 | 2.80 | 3.50 |

It could be observed from tables 2 and 3 that the lenses 1 to 5 according to the invention obtained in Examples 1 to 5 possess very good antireflective properties in the visible region ($R_v \leq 0.30\%$), with no detrimental on the antireflective performances in the ultraviolet region ($R_{uv} \leq 5\%$ and <3% for lenses 5 for an angle of incidence of 35°).

Figure 1:
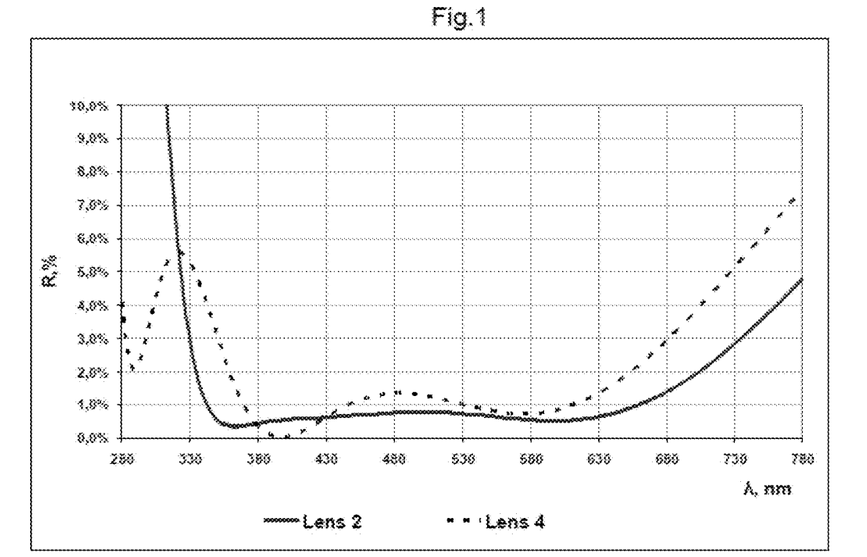
FIG. 1 shows the variations of the reflection R on the front face surface of some lenses (lenses 2 and 4 according to the invention)

Indeed, as it is also illustrated on FIG. 1, lenses 2 and 4 obtained respectively from examples 2 and 4 reduces UVB radiation reflections and is as the same time is very efficient to reduce the reflection in the visible region. It is worth noting that this results can be obtained with slightly different reflectance curves: lens 2 has a very low reflectance down to 355 nm and reflectance increases sharply when wave length decreases, whereas lens 4 has a very moderated reflectance (below 6%) over the whole [280 nm-380 nm] range.

Moreover, the lenses obtained in Examples 1 to 5 have outstanding transparency properties. The adhesion of the coatings to the substrate was also very satisfactory.

Figure 2:
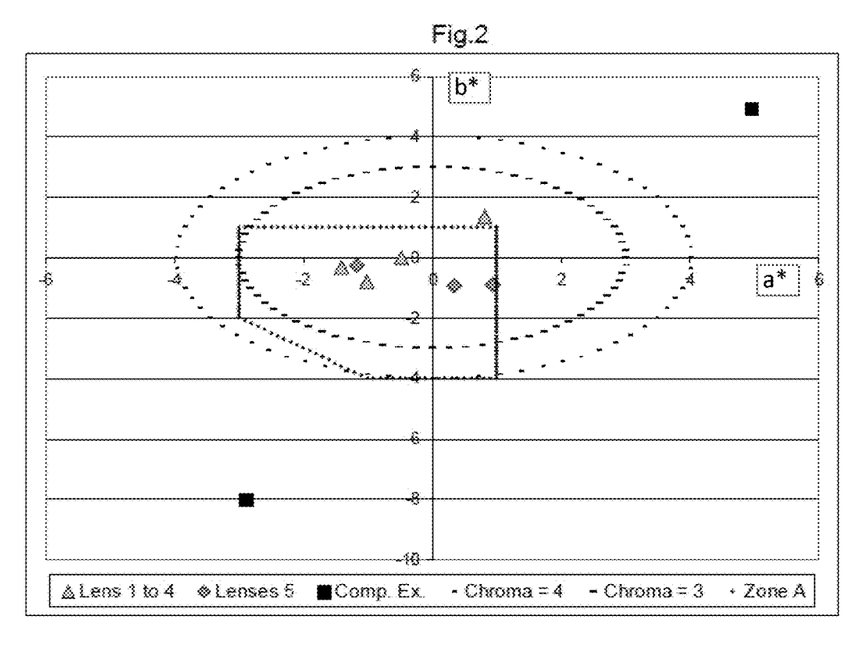
FIG. 2 shows the colorimetric coefficients of lenses 1 to 5 according to the invention and one lens according to the prior art in the colometric system CIE L*a*b*, a Chroma ≤4 and a Chroma ≤3 are delimited by doted lines.

As compared to the comparatives examples, lenses 1 to 5 according to the invention have a very low chroma: less than 2, whereas the chroma of the comparatives examples is higher than 8.5. Hence, even if the hue h° varies, the perceived colors of multilayered antireflective coating is not collectible by a person's eyes. FIG. 2 shows that lenses 1 to 5 are located in a very narrow zone of La*b* space, where chroma is lower than 3, and often in the zone A in which colour is hardly noticed by any observer.

Robustness of Lens 1, 2 and 4

A simulation was made so as to test the robustness of the multilayered antireflective coating according to the invention. Hence 500 iterations were made so as to evaluate the variations (+−2.2% in normal distribution) induced by the manufacturing process which may affect the performances and properties of two different lens comprising the same structure (same composition and thickness layers), such as the residual reflected color (h°, C*) and the optical factors: $R_v$, $R_m$, $R_{uv}$ for an angle of incidence of 15° (illuminant D65 and observer 10°).

TABLE 4

| | Simulation | h° | C* | $R_m$, % (400-700 nm) | $R_v$, % (380-780) | Rm, % 360-380 nm) | Ruv, % (280-380 nm) θ = 35° |
|---|---|---|---|---|---|---|---|
| Lens 1 | Design Nominal | 219 | 1.3 | 0.58 | 0.44 | 2.48 | 3.02 |
| | Standard deviation | 100 | 1.3 | 0.04 | 0.07 | 0.36 | 0.62 |
| | Average | 196 | 2.1 | 0.61 | 0.45 | 1.83 | 3.14 |
| Lens 2 | Design Nominal | 193 | 1.4 | 0.77 | 0.66 | 0.48 | 3.72 |
| | Standard deviation | 70 | 1.2 | 0.08 | 0.11 | 0.12 | 0.84 |
| | Average | 197 | 2.3 | 0.78 | 0.67 | 0.51 | 3.76 |
| Lens 4 | Design Nominal | 181 | 0.5 | 1.27 | 0.98 | 0.31 | 3.63 |
| | Standard deviation | 100 | 1.4 | 0.16 | 0.13 | 0.10 | 0.53 |
| | Average | 193 | 2.2 | 1.28 | 0.99 | 0.34 | 3.61 |

This table 4 shows that lens 1, 2 and 4 according to the present invention have a very good robustness. Indeed, the 500 different iterations do not affect the optical factors or the reflected color of the ophthalmic lens of the invention.

The invention claimed is:

1. An ophthalmic lens comprising a transparent substrate with a front main face and a rear main face, said rear main face being coated with a multilayered antireflective coating comprising a stack of at least one layer having a refractive index higher than 1.6 and of at least one layer having a refractive index lower than 1.55, wherein:

a mean reflection factor $R_{UV}$ on said rear face between 280 nm and 380 nm, weighted by a function $W(\lambda)$, is lower than or equal to 5%, for an angle of incidence of 35°; and a Chroma C* of reflected light for an angle of incidence ($\theta$) of 15° is equal or lower than 4, and wherein said antireflective coating is substantially achromatic.

2. The lens according to claim 1, wherein the mean reflection factor $R_{UV}$ on said rear face between 280 nm and 380 nm, weighted by the function $W(\lambda)$, is lower than or equal to 4%, for an angle of incidence of 35°.

3. The lens according to claim 1, wherein the Chroma C* of reflected light for an angle of incidence ($\theta$) of 15° is lower or equal to 3.

4. The lens according to claim 1, wherein the Chroma C* of reflected light for an angle of incidence ($\theta$) of 15° is located in the area of a L*a*b* space defined by:

$-3<=a^*<=1$ and $-4<=b^*<=1$ and $(a^*+b^*)>=-5$.

5. The lens according to claim 1, wherein the Chroma C* of reflected light measured on two separated points of the same lens differs by less than 2.

6. The lens according to claim 1, wherein the multilayered antireflective coating comprises a number of layers higher than or equal to 3 and lower than or equal to 7.

7. The lens according to claim 6, wherein the multilayered antireflective coating comprises a number of layers higher than or equal to 4 and lower than or equal to 6.

8. The lens according to claim 1, wherein the mean reflection factor on said rear face in a visible region $R_m$ is lower than or equal to 3%, for an angle of incidence lower than or equal to 35°.

9. The lens according to claim 8, wherein the mean reflection factor on said rear face in the visible region $R_m$ is lower than or equal to 2.5%, for an angle of incidence lower than or equal to 35°.

10. The lens according to claim 1, wherein the mean light reflection factor on said rear face in a visible region $R_v$ is lower than or equal to 2%, for an angle of incidence lower than or equal to 35°.

11. The lens according to claim 10, wherein the mean light reflection factor on said rear face in the visible region $R_v$ is lower than or equal to 1.5%, for an angle of incidence lower than or equal to 35°.

12. The lens according to claim 1, wherein the antireflective coating is deposited on a silica-based sub-layer layer having a thickness of from 100 to 300 nm.

13. The lens according to claim 1, wherein the antireflective coating comprises at least two layers having a refractive index higher than 1.6 and at least two layers having a refractive index lower than 1.55.

14. The lens according to claim 1, wherein the antireflective coating comprises at least one electrically conductive layer.

15. The lens according to claim 1, wherein the antireflective coating comprises, in the direction moving away from the substrate, a layer having a refractive index higher than 1.6 with a thickness of from 8 to 25 nm, a layer having a refractive index lower than 1.55 with a thickness of from 15 to 40 nm, a layer having a refractive index higher than 1.6 with a thickness of from 80 to 115 nm, optionally an electrically conductive layer with a thickness of from 3 to 10 nm, and a layer having a refractive index lower than 1.55, with a thickness of from 65 to 95 nm.

16. The lens according to claim 15, wherein the antireflective coating comprises, in the direction moving away from the substrate, a layer having a refractive index higher than 1.6 with a thickness of from 8 to 25 nm, a layer having a refractive index lower than 1.55 with a thickness of from 15 to 40 nm, a layer having a refractive index higher than 1.6 with a thickness of from 85 to 110 nm, optionally an electrically conductive layer with a thickness of from 3 to 10 nm, and a layer having a refractive index lower than 1.55, with a thickness of from 65 to 95 nm.

17. The lens according to claim 15, wherein the antireflective coating comprises, in the direction moving away from the substrate, a layer having a refractive index higher than 1.6 with a thickness of from 10 to 18 nm, a layer having a refractive index lower than 1.55 with a thickness of from 25 to 35 nm, a layer having a refractive index higher than 1.6 with a thickness of from 95 to 110 nm, optionally an electrically conductive layer with a thickness of from 3 to 10 nm, and a layer having a refractive index lower than 1.55, with a thickness of from 75 to 85 nm.

18. The lens according to claim 15, wherein the antireflective coating comprises, in the direction moving away from the substrate, a layer having a refractive index higher than 1.6 with a thickness of from 18 to 25 nm, a layer having a refractive index lower than 1.55 with a thickness of from 15 to 25 nm, a layer having a refractive index higher than 1.6 with a thickness of from 85 to 95 nm, optionally an electrically conductive layer with a thickness of from 3 to 10 nm, and a layer having a refractive index lower than 1.55, with a thickness of from 70 to 90 nm.

19. The lens according to claim 1, wherein said ophthalmic lens is substantially achromatic.

\* \* \* \* \*